United States Patent [19]

Matsuura et al.

[11] Patent Number: 4,814,314

[45] Date of Patent: Mar. 21, 1989

[54] CATALYST FOR OLEFIN POLYMERIZATION

[75] Inventors: Mitsuyuki Matsuura; Takashi Fujita; Katsumi Hirakawa, all of Yokkaichi, Japan

[73] Assignee: Mitsubishi Petrochemical Company Limited, Tokyo, Japan

[21] Appl. No.: 100,268

[22] Filed: Sep. 23, 1987

[30] Foreign Application Priority Data

Sep. 26, 1986 [JP] Japan ................... 61-227819
Oct. 2, 1986 [JP] Japan ................... 61-235293
Oct. 17, 1986 [JP] Japan ................... 61-246592

[51] Int. Cl.$^4$ ............................... C08F 4/64
[52] U.S. Cl. ...................... 502/112; 502/108; 502/113; 502/119; 502/121; 502/125; 502/127
[58] Field of Search .............. 502/108, 112, 113, 119, 502/121, 125, 127

[56] References Cited

U.S. PATENT DOCUMENTS

| | | | |
|---|---|---|---|
| 4,339,351 | 7/1982 | Mashita et al. | 502/125 X |
| 4,343,721 | 8/1982 | Goodall et al. | |
| 4,363,902 | 12/1982 | Kurz | |
| 4,406,818 | 9/1983 | Martin et al. | 502/113 X |
| 4,442,276 | 4/1984 | Kashiwa et al. | 502/125 X |
| 4,472,521 | 9/1984 | Band | 502/119 X |
| 4,472,524 | 9/1984 | Albizzati | 502/113 X |
| 4,492,768 | 1/1985 | Hawley | 502/125 X |
| 4,508,844 | 4/1985 | Agapiou | 502/108 X |
| 4,518,751 | 5/1985 | Mizogami et al. | 502/119 X |
| 4,525,552 | 6/1985 | Kuroda et al. | 502/125 X |
| 4,550,094 | 10/1985 | Hanji et al. | 502/113 X |
| 4,552,858 | 11/1985 | Imai et al. | 502/125 X |
| 4,558,024 | 12/1985 | Best | 502/125 X |
| 4,562,168 | 12/1985 | Lee | 502/119 X |
| 4,562,173 | 12/1985 | Terano et al. | 502/127 |
| 4,588,703 | 5/1986 | Cowan et al. | 502/113 X |
| 4,647,550 | 3/1987 | Kohora et al. | 502/112 X |
| 4,659,792 | 4/1987 | Kashiwa et al. | 502/127 X |

FOREIGN PATENT DOCUMENTS 149906  8/1984  Japan ................... 502/125

Primary Examiner—Patrick P. Garvin
Attorney, Agent, or Firm—Oblon, Fisher, Spivak, McClelland & Maier

[57] ABSTRACT

A catalyst for olefin polymerization which comprises a combination of:

Component which is a solid catalyst component A obtained by contacting a component (i) which is a solid component comprising titanium, magnesium and halogen as essential elements with a component (ii), which is a silicon compound represented by formula: $R^1R^2{}_{3-n}Si(OR^3)_n$ where $R^1$ stands for a branched hydrocarbon radical, $R^2$ stands for a hydrocarbon radical which is the same as or different from $R^1$ and n stands for a number satisfying an equation: $1 \leq n \leq 3$;

Component B which is an organoaluminum compound; and

Component C which is a compound represented by a formula $M(OR^4)_xR^5{}_yX_z$ in which M stands for an element selected from the group consisting of B, Al, C, Si, Sn, P, S, Cl, Br, I, Fe, Ti, V, Zr, Mg, Ca and Zn, $R^4$ and $R^5$ each stand for a hydrocarbon radical having 1 to 20 carbon atoms which are the same as or different from each other and X stands for halogen atom, each of x, y and z is a number which is equal to zero or is equal to or less than the valence of the element M and the sum of x, y and z is equal to the valence of the element M.

8 Claims, No Drawings

CATALYST FOR OLEFIN POLYMERIZATION

BACKGROUND OF THE INVENTION

1. Field of the Art

The invention relates to catalysts for olefin polymerization. The catalysts of the invention are capable of providing high and prolonged catalytic activity for olefin polymerization and making it easy to control the molecular weight of the resulting polymers.

2. Prior Art

It has recently been suggested that polymerization of an α-olefin having 3 or more carbon atoms can be carried out in the presence of a solid catalyst comprising titanium, magnesium and halogen as essential elements to produce polymer with high stereoregularity. The suggested methods require, in addition to the solid catalyst and organoaluminum compound, a certain electron donor (external donor) compound during the polymerization reaction to increase the stereoregularity of the polymer product (for example, Japanese Patent Application Laid-Open Specifications No. 151,691/1977, No. 21,093/1978, No. 127,408/1980, No. 63,310/1982). Such use of an electron donor compound as a third component, however, makes the catalyst system complicated and makes it difficult to control polymerization, namely product properties in contrast to the advantages of an increase in the stereoregularity. Furthermore, the use of such electron donor generally shortens the catalyst activity.

In view of the above, the inventors developed a new catalyst system in which stereoregularity of the polymer product can be regulated without use of a certain electron donor compound (U.S. patent application Ser. No. 07/014,835 filed Feb. 2, 1987 and now Pat. No. 4,780,443.

On the other hand, control of molecular weight in a polymer product (molecular weight, distribution of molecular weight, etc.) is also an important element. Since the above mentioned electron donor compound as known as a third component does not control molecular weight sufficiently, new catalysts have been desired which make the molecular weight control possible without decreasing both the stereoregularity of a polymer and catalystic activity.

SUMMARY OF THE INVENTION

The present invention provides a catalyst for olefin polymerization which comprises a combination of:

Component A which is a solid catalyst component obtained by contacting a component (i) and a component (ii) where component (i) is a solid component comprising titanium, magnesium and halogen as essential elements and component (ii) is a silicon compound represented by the formula- $R^1R^2{}_{3-n}Si(OR^3)_n$ in which $R^1$ stands for a branched hydrocarbon radical, $R^2$ stands for a hydrocarbon residue which is the same as or different from $R^1$ and n stands for a number satisfying the equation: $1 \leq n \leq 3$;

Component B which is an organoaluminum compound; and

Component C which is a compound represented by the formula: $M(OR^4)_xR^5{}_yX_z$ in which M stands for an element selected from the group consisting of B, Al, C, Si, Sn, P, S, Cl, Br, I, Fe, Ti, V, Zr, Mg, Ca and Zn, $R^4$ and $R^5$ each stand for similar or different hydrocarbon radical having one to twenty carbon atoms and X stands for halogen atom, each of x, y and z is a number which is equal to zero or is equal to or less than the valence of the element M and sum of x, y and z is equal to the valence of M.

According to the present invention, Component C has almost no reactivity to organoaluminum compound (Component B) in contrast to typical electron donors, such as esters and amines, which characterizes this new system. Problem in the prior art techniques thus can be abviated.

The advantages realized by the invention are as follows:

(1) The catalyst according to the invention catalyzes olefin polymerization in high and prolonged catalyzing activity.

(2) The catalyst according to the invention has a better property in terms of polymerization temperature, in that the polymerization temperature is widened to the range of 60° to 90° C. in contrast to the range of 60°-75° C. in the prior art polymerization. As a result, polymerization at higher temperature becomes possible.

(3) The catalyst according to the invention makes molecular weight control easy whereby:

(a) An ultra high molecular weight polymer can be produced. For example, polypropylene can be produced of an average molecular weight of about 2,000,000;

(b) Distribution of molecular weight can be controlled, especially the range of molecular weight distribution can be widened or narrowed; and (c) In case of copolymerization of ethylene and propylene in 2 or more steps, the catalyst of the invention is able to produce propylene copolymers of high rigidity and high impact stability, especially propylene/ethylene block copolymer in which the molecular weight of the propylene/ethylene copolymer moiety and/or that of polyethylene moiety has been increased.

DETAILED DESCRIPTION OF THE INVENTION

Catalyst

The catalyst of the invention comprises a combination of Components A, B and C. The wording "comprise a combination of" means the state where the components referred to are eventually comprised in it and does not mean that the process of the combination is necessarily conducted with respect to the components as such. The term also means not to exclude the combination of further components therewith.

Component A

Component (i) used for producing Component A in the invention is a solid Ziegler-catalyst component comprising titanium, magnesium and halogen as essential elements. The wording "comprising titanium, magnesium and halogen as essential elements" only means substantial existence of these three elements, and it does not prescribe their existing form, nor exclude existence of additional components. Also the manner whereby these three elements are introduced is arbitrary. Accordingly, this solid catalyst component may contain other metal or metalloid elements as additional components or an electron donor compound as so-called "internal donor".

As mentioned above, solid Ziegler catalyst component comprising these three elements as essential components are known. In the invention, any of the known solid components may be used. For example, there can be used solid components disclosed in Japanese Patent Application Laid-Open Specifications No. 45,688/1978, No. 3,894/1979, No. 31,092/1979, No. 39,483/1979, No. 94,591/1979, No. 118,484/79, No. 131,589/1979, No. 75,411/1980, No. 90,510/1980, No. 90,511/1980, No. 127,405/1980, No. 147,507/1980, No. 155,003/1980, No. 18,609/1981, No. 70,005/1981, No. 72,001/1981, No. 86,905/1981, No. 90,807/1981, No. 155,206/1981, No. 3,803/1982, No. 34,103/1982, No. 92,007/1982, No. 121,003/1982, No. 5,309/1983, No. 5,310/1983, No. 5,311/1983, No. 8,706/1983, No. 27,732/1983, No. 32,604/1983, No. 32,605/1983, No. 67,703/1983, No. 117,206/1983, No. 127,708/1983, No. 183,708/1983, No. 183,709/1983, No. 149,905/1984 and No. 149,906/1984.

The component (i) can comprise further element such as silicon, aluminum, bromine etc.

As examples of the magnesium compound used as the magnesium a source in the present invention are a magnesium dihalide, a dialkoxy magnesium, an alkoxy magnesium halide, a magnesium oxyhalide, a dialkyl magnesium, magnesium oxide, magnesium hydroxide and a magnesium salt of a carboxylic acid. Among them magnesium dihalide is preferred, and especially magnesium dichloride is most preferred.

As examples of titanium compound used as the titanium source, are compounds represented by the following formula:

$$Ti(OR^6)_{4-n}X_n$$

wherein $R^6$ stands for a hydrocarbon radical, preferably a hydrocarbon residue having 1 to about 10 carbon atoms, X stands for a halogen atom and n is a number of from 0 to 4.

As specific examples, there can be mentioned $TiCl_4$, $TiBr_4$, $Ti(OC_2H_5)Cl_3$, $Ti(OC_2H_5)_2Cl_2$, $Ti(OC_2H_5)_3Cl$, $Ti(O-i-C_3H_7)Cl_3$, $Ti(O-n-C_4H_9)Cl_3$, $Ti(O-n-C_4H_9)_2Cl_2$, $Ti(OC_2H_5)Br_3$, $Ti(OC_2H_5)(OC_4H_9)_2Cl$, $Ti(O-n-C_4H_9)_3Cl$, $Ti(O-C_6H_5)Cl_3$, $Ti(O-i-C_4H_9)_2Cl_2$, $Ti(OC_5H_{11})Cl_3$, $Ti(OC_6H_{13})Cl_3$, $Ti(OC_2H_5)_4$, $Ti(O-n-C_3H_7)_4$, $Ti(O-n-C_4H_9)_4$, $Ti(O-i-C_4H_9)_4$, $Ti(O-n-C_6H_{13})_4$, $Ti(O-n-C_8H_{17})_4$ and $Ti[OCH_2CH(C_2H_5)C_4H_9]_4$.

Molecular compounds formed by reaction of $TiX'_4$ (in which X' stands for a halogen atom) with an electron donor can also be used. As specific examples, $TiCl_4.CH_3COC_2H_5$, $TiCl_4.CH_3CO_2C_2H_5$, $TiCl_4.C_6H_5NO_2$, $TiCl_4.CH_3COCl$, $TiCl_4.C_6H_5COCl$, $TiCl_4.C_6H_5CO_2C_2H_5$, $TiCl_4.ClCOC_2H_5$ and $TiCl_4.C_4H_4O$ can be mentioned.

Among these titanium compounds, $TiCl_4$, $Ti(O-n-C_4H_9)_4$, $Ti(O-n-C_4H_9)Cl_3$ and $Ti(OC_2H_5)_4$ are preferred, and $TiCl_4$ and $Ti(O-n-C_4H_9)_4$ are more preferred.

The halogen is ordinarily supplied by the above-mentioned magnesium halide and/or titanium halide, but a known halogenating agent such as an aluminum halide, a silicon halide or a phosphorus halide may be used as the halogen source.

As the halogen contained in the solid catalyst component, there can be mentioned fluorine, chlorine, bromine, iodine and a mixture thereof, and chlorine is especially preferred.

In addition to the foregoing essential ingredients, the solid component used in the present invention can comprise another ingredient, for example, a silicon compound such as $SiCl_4$, $CH_3SiCl_3$, $HSiCl_3$, $H(CH_3)SiCl_2$, $H[Si(CH_3)_2O]_2Si(CH_3)_2H$, methylhydrogen polysiloxane, 1,3,5,7-tetramethylcyclotetrasiloxane and 1,3,5,7,9-pentamethylcyclopentasiloxane; an aluminum compound such as $Al(O-i-C_3H_8)_3$, $AlCl_3$, $AlBr_3$, $Al(OC_2H_5)_3$ and $Al(OCH_3)_2Cl$; or a boron compound such as $B(OCH_3)_3$, $B(OC_2H_5)_3$ and $B(OC_6H_5)_3$, and these ingredients can be left as the silicon, aluminum and boron ingredients in the solid catalyst component.

The solid component (i) can be prepared by using an electron donor compound as an internal electron donor.

As the electron donor (internal donor) used for the preparation of the solid component, there can be used oxygen-containing electron donors such as alcohols, phenols, ketones, aldehydes, carboxylic acids, esters of organic acids and inorganic acids, ethers, acid amides and acid anhydrides; and nitrogen-containing electron donors such as ammonia, amines, nitriles and isocyanates.

More specifically, there can be mentioned alcohols having 1 to 18 carbon atoms, such as methanol, ethanol, propanol, pentanol, hexanol, octanol, dodecanol, octadecyl alcohol, benzyl alcohol, phenylethyl alcohol, cumyl alcohol and isopropylbenzyl alcohol; phenols having 6 to 25 carbon atoms, which can have an alkyl group, such as phenol, cresol, xylenol, ethylphenol, propylphenol, cumylphenol, nonylphenol and naphthol; ketones having 3 to 15 carbon atoms, such as acetone, methylethylketone, methylisobutylketone, acetophenone and benzophenone; aldehydes having 2 to 15 carbon atoms such as acetaldehyde, propionaldehyde, octylaldehyde, benzaldehyde, tolualdehyde and naphthaldehyde; esters of an organic acid having 2 to 20 carbon atoms such as methyl formate, methyl acetate, ethyl acetate, vinyl acetate, propyl acetate, octyl acetate, cyclohexyl acetate, ethyl propionate, methyl butyrate, ethyl valeate, ethyl stearate, methyl chloroacetate, ethyl dichloroacetate, methyl methacrylate, ethyl crotonate, ethyl cyclohexane-carboxylate, methyl benzoate, ethyl benzoate, propyl benzoate, butyl benzoate, octyl benzoate, cyclohexyl benzoate, phenyl benzoate, benzyl benzoate, methyl toluylate, ethyl toluylate, amyl toluylate, ethyl ethylbenzoate, methyl anisate, ethyl anisate, ethyl ethoxybenzoate, diethyl phthalate, dibutyl phthalate, diheptyl phthalate, γ-butyrolactone, α-valerolactone, cumarine, phthalide, ethylene carbonate, cellosolve acetate, ethylcellosolve acetate, butylcellosolve acetate, cellosolve isobutyrate and cellosolve benzoate; esters of an inorganic acid such as ethyl silicate, butyl silicate, phenyltriethoxysilane and other silicic acid esters; acid halides having 2 to 15 carbon atoms such as acetyl chloride, benzoyl chloride, toluoyl chloride, anisoyl chloride, phthaloyl chloride and isophthaloyl chloride; ethers having 2 to 20 carbon atoms such as methyl ether, ethyl ether, isopropyl ether, butyl ether, amyl ether, tetrahydrofuran, anisole and diphenyl ether; acid amides such as acetic acid amide, benzoic acid amide and toluylic acid amide; amines such as methylamines, ethylamines, diethylamine, tributylamine, piperidine, tribenzylamine, aniline, pyridine, picoline and tetramethyl ethylene diamine; and nitriles such as acetonitrile, benzonitrile and tolunitrile. A mixture of two or more of these electron donors can be used.

The more preferable as the internal electron donor are esters of an organic acid or acid halides, and the most preferable are esters of phthalic acid, phthaloyl halides and cellosolve acetate.

The amounts used of the respective ingredients are not particularly critical, so far as the intended effects of the present invention are concerned. However, the amounts described below are generally preferred.

The titanium compound is used in such an amount that the molar ratio to the amount used of the magnesium compound is $1 \times 10^{-4}$ to 1,000, preferably 0.01 to 10. When a halogenating agent is used, the molar ratio of the amount of the halogenating agent to the amount of the magnesium compound is $1 \times 10^{-2}$ to 1,000, preferably 0.1 to 100, irrespective of whether or not the titanium compound and/or the magnesium compound contains a halogen. The amount of the electron donor compound is such that the molar ratio to the amount of the magnesium compound is $1 \times 10^{-3}$ to 10, preferably 0.01 to 5.

The amount of each of the silicon, aluminum and boron compounds is such that the molar ratio to the amount of the magnesium compound is $1 \times 10^{-3}$ to 100, preferably 0.01 to 1.

The solid component use in the present invention can be prepared according to known methods, preferably the methods described below. Specific examples of the compounds referred to in the following description are those as described above.

(a) A magnesium halide is contacted with an electron donor and a titanium-containing compound.

(b) Alumina or magnesia is treated with a phosphorus halide compound and is then contacted with a magnesium halide, an electron donor and a halogen-containing titanium compound.

(c) A magnesium halide is contacted with a titanium tetra-alkoxide and a polymeric silicon compound and the obtained solid component is contacted with a halogen-containing titanium compound and/or a silicon halide, if necessary, together with an electron donor. The polymeric silicon compound is represented by the following formula:

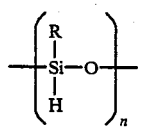

wherein R stands for a hydrocarbon radical having 1 to 10 carbon atoms, preferably 1 to 6 carbon atoms, and n is a degree of polymerization, which is preferably such that the polymer has a viscosity of 0.1 to 100 centistokes (cSt).

More particularly, methylhydrogenpolysiloxane, ethylhydrogenpolysiloxane, phenylhydrogenpolysiloxane, cyclohexylhydrogenpolysiloxane, 1,3,5,7-tetramethylcyclotetrasiloxane, 1,3,5,7,9-pentamethylcyclopentasiloxane etc. are preferred.

(d) A magnesium compound is dissolved by means of a titanium tetra-alkoxide and an electron donor, a solid component is precipitated from the solution by a titanium- and halogen-compound or halogenating agent, and the solid component is contacted with a titanium compound.

(e) An organic magnesium compound such as a Grignard reagent, is reacted with a halogenating agent and a reducing agent and the reaction product is contacted with an electron donor and a titanium compound.

(f) A magnesium alkoxide is contacted with a halogenating agent and/or a titanium compound in the presence or absence of an electron donor.

Thus, a solid component comprising titanium, magnesium and a halogen as essential ingredients is obtained.

The so-obtained solid component can be used directly as the solid component (i), and also a solid component obtained by contacting the so-obtained solid component with an olefin in the presence of an organoaluminum compound to effect a preliminary polymerization on it can be used as the component (i). When the component (i) is one which has undergone the preliminary polymerization, the component (ii) is preferably combined with the component (i) after the preliminary polymerization.

The conditions for the preliminary polymerization of the olefin for obtaining the component (i) are not particularly critical, but it is generally preferred that the preliminary polymerization be carried out under conditions: the polymerization temperature is 0° to 80° C., especially 10° to 60° C.; and the olefin is polymerized in an amount of 0.001 to 50 g, especially 0.1 to 10 g, per g of the solid component.

Any organoaluminum compounds known as a component in Ziegler-type catalysts can be used for the preliminary polymerization. For example, there can be mentioned $Al(C_2H_5)_3$, $Al(i-C_4H_9)_3$, $Al(C_6H_{13})_3$, $Al(C_8H_{17})_3$, $Al(C_{10}H_{21})_3$, $Al(C_2H_5)_2Cl$, $Al(i-C_4H_9)_2Cl$, $Al(C_2H_5)_2H$, $Al(i-C_4H_9)_2H$ and $Al(C_2H_5)_2(OC_2H_5)$.

Among these organoaluminum compounds, $Al(C_2H_5)_3$ and $Al(i-C_4H_9)_3$ are especially preferred. Furthermore, a combination of a trialkylaluminum and an alkylaluminum halide and a combination of a trialkylaluminum, an alkylaluminum halide and an alkylaluminum ethoxide are effective. For example, there can be mentioned a combination of $Al(C_2H_5)_3$ and $Al(C_2H_5)_2Cl$, a combination of $Al(i-C_4H_9)_3$ and $Al(i-C_4H_9)_2Cl$, a combination of $Al(C_2H_5)_3$ and $Al(C_2H_5)_{1.5}Cl_{1.5}$, and a combination of $Al(C_2H_5)_3$, $Al(C_2H_5)_2Cl$ and $Al(C_2H_5)_2(OC_2H_5)$.

The amount of the organoaluminum compound used for the preliminary polymerization to the amount of the Ti component in the solid catalyst Component (A) is such that the Al/Ti molar ratio is from 1 to 20, preferably from 2 to 10. At the preliminary polymerization, a known electron donor, such as an alcohol, an ester or a ketone may be added in addition to the organoaluminum compound.

As the olefin used for the preliminary polymerization, there can be mentioned ethylene, propylene, 1-butene, 1-hexene and 4-methylpentene-1. Hydrogen may be present at the preliminary polymerization.

Component (ii)

The component (ii) to be contacted with the above-mentioned component (i) for preparing the solid catalyst Component (A) of the present invention is a silicon compound represented by the following formula:

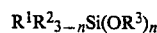

wherein $R^1$ stands for a branched hydrocarbon radical, $R^2$ stands for a hydrocarbon radical, which may be the same as or different from $R^1$, $R^3$ stands for a hydrocarbon radical, and n is a number of from 1 to 3.

It is preferred that $R^1$ be branched from the carbon atom adjacent to the silicon atom, and in this case, it is preferred that the branched group be an alkyl group, a cycloalkyl group, or an aryl group such as for example, a phenyl group or a methyl-substituted phenyl group. Furthermore, it is preferred that in $R^1$, the carbon atom adjacent to the silicon atom, that is, the carbon atom at the α-position, be a secondary or tertiary carbon atom. It is especially preferred that the carbon atom bonded to the silicon atom is a tertiary carbon atom. The $R^1$ is ordinarily of 3 to 20 carbon atoms, preferably 4 to 10 carbon atoms. Generally, $R^2$ is a branched or linear hydrocarbon group having 1 to 20 carbon atoms, preferably 1 to 10 carbon atoms, $R^3$ is ordinarily an hydrocarbon group, preferably a linear hydrocarbon group having 1 to 4 carbon atoms.

Specific examples of the component (ii) include:

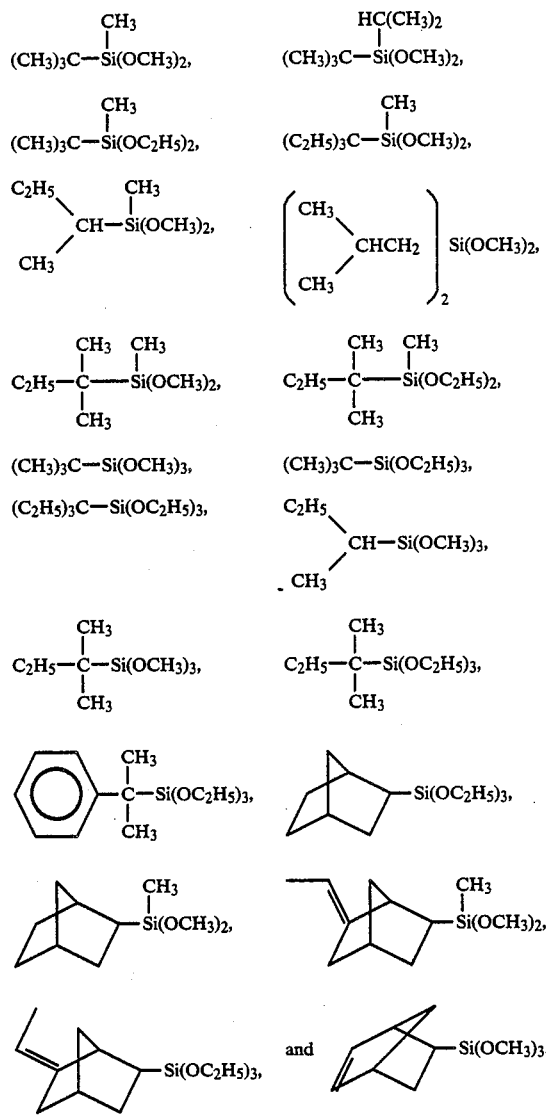

Contact of the components (i) and (ii)

The conditions for contacting the component (i) with the component (ii) are not particularly critical, so far as the intended effects of the present invention can be attained, but conditions described below are ordinarily preferred. The contact temperature is about −50° to about 200° C., preferably 0° to 100° C. As the contacting method, there can be mentioned a mechanical method in which a rotary ball mill, a vibrating mill, a jet mill or a medium stirring pulverizer is used, and a method in which the contact is effected by stirring in the presence of an inert diluent. As the inert diluent, there can be mentioned as aliphatic or aromatic hydrocarbon and a halogenated hydrocarbon.

The amounts of the components (i) and (ii) to be contacted with each other are such that, irrespective of whether the component (i) has undergone the preliminary polymerization, the atomic ratio of silicon of the component (ii) to titanium of the component (i), silicon/titanium, is from 0.01 to 1,000, preferably from 0.1 to 100.

Component (B)

The Component (B) is an organoaluminum compound. For example, there can be used organoaluminum compounds represented by the following general formula:

$$R^7{}_{3-n}AlX_n \text{ or } R^8{}_{3-m}Al(OR^9)_m$$

wherein $R^7$ and $R^8$, which may be the same or different, each stand for a hydrocarbon radical having 1 to about 20 carbon atoms or a hydrogen atom, $R^9$ stands for a hydrocarbon residue, X stands for a halogen atom, n is a number of $0 \leq n < 3$, and m is a number of $0 < m < 3$.

As specific examples, there can be mentioned (a) trialkylaluminum compounds such as trimethylaluminum, triethylaluminum, tri-isobutylaluminum, trihexylaluminum, trioctylaluminum and tridecylaluminum, (b) alkylaluminum halides such as diethylaluminum monochloride, diisobutylaluminum monochloride, ethylaluminum sesquichloride and ethylaluminum dichloride, (c) alkylaluminum hydrides such as diethylaluminum hydride and di-isobutylaluminum hydride and (d) aluminum alkoxides such as diethylaluminum ethoxide and diethylaluminum phenoxide.

In combination with the organoaluminum compounds (a) through (c), there may be used other organometal compounds such as alkylaluminum alkoxides represented by the following formula:

$$R^{10}{}_{3-a}Al(OR^{11})_a$$

wherein a is a number of from 1 to 3, and $R^{10}$ and $R^{11}$, which may be the same or different, each stand for a hydrocarbon radical having 1 to about 20 carbon atoms.

For example, there can be mentioned a combination of triethylaluminum and diethylaluminum ethoxide, a combination of diethylaluminum monochloride and diethylaluminum ethoxide, a combination of ethylaluminum dichloride and ethylaluminum diethoxide, and a combination of triethylaluminum, diethylaluminum ethoxide and diethylaluminum chloride.

Component C

The component C used in the invention is a compound represented by a formula $M(OR^4)_xR^5{}_yX_z$, in which M stands for any element selected from the group consisting of B, Al, C, Si, Sn, P, S, Cl, Br, I, Fe, Ti, V, Zr, Mg, Ca and Zn, $R^4$ and $R^5$ stand for similar or different hydrocarbon radicals having 1 to 20 carbon atoms, preferably 1 to 6 carbon atoms, and X stands for halogen atom. each of x, y and z is a number which is equal to zero or is equal to or less than the valency of the element M and sum of them is equal to the valency of the element M. Among elements mentioned above, B, Al, C, Si, P, Fe, Ti, Zr, Mg, Ca and Zn are preferable and B, Al, Si, Ti, C and Zr are especially preferable.

Specific examples are as follows.

Compounds of group A: metal alkoxides such as Mg(OCH$_3$)$_2$, Mg(OC$_2$H$_5$)$_2$, Mg(OiC$_3$H$_7$)$_2$, Mg(O—nC$_3$H$_7$)$_2$, Mg(O—nC$_4$H$_9$)$_2$, Mg(OC$_6$H$_5$)$_2$, (C$_2$H$_5$)Mg(OC$_2$H$_5$), Mg(OCH$_3$)Cl, Mg(OC$_2$H$_5$)Cl, Ca(OCH$_3$)$_2$, Ca(OC$_2$H$_5$)$_2$, Ca(OC$_6$H$_5$)$_2$, B(OCH$_3$)$_3$, B(OC$_2$H$_5$)$_3$, B(O—nC$_3$H$_7$)$_3$, B(O—nC$_4$H$_9$)$_3$, B(O—nC$_6$H$_{13}$)$_3$, B(OC$_6$H$_5$)$_3$, B(OCH$_3$)$_2$Cl, B(OCHHd 3)(OC$_2$H$_5$)$_2$, Zr(OCH$_3$)$_4$, Zr(OC$_2$H$_5$)$_4$, Zr(OC$_4$H$_9$)$_4$, Zr(OC$_6$H$_5$)$_4$, Zr(OC$_2$H$_5$)$_2$Cl$_2$, Al(OCH$_3$)$_3$, Al(OC$_2$H$_5$)$_3$, Al(OiC$_3$H$_7$)$_3$, Al(OnC$_3$H$_7$)$_3$, Al(OnC$_4$H$_9$)$_3$, Al(OC$_6$H$_5$)$_3$, Al(OCH$_3$)$_2$Cl, Al(OC$_2$H$_5$)Cl$_2$, Al(C$_2$H$_5$)(OC$_4$H$_9$)$_2$, Al(CH$_3$)(OC$_2$H$_5$)Cl, Al(OnC$_4$H$_9$)Cl$_2$, Zn(OCH$_3$)$_2$, Zn(OC$_2$H$_5$)$_2$, Zn(OnC$_4$H$_9$)$_2$, (CH$_3$)Si(OCH$_3$)$_3$, (CH$_3$)Si(OC$_2$H$_5$)$_3$, (C$_2$H$_5$)$_2$Si(OCH$_3$)$_2$, (n—C$_6$H$_{11}$)Si(OCH$_3$)$_3$, (C$_2$H$_5$)Si(OC$_2$H$_5$)$_3$, (n—C$_{10}$H$_{21}$)Si(OC$_2$H$_5$)$_3$, (CH$_2$=CH)Si(OCH$_3$)$_3$, Si(OCH$_3$)$_4$, (C$_2$H$_5$)$_2$Si(OC$_2$H$_5$)$_2$, (C$_{17}$H$_{35}$)Si(OCH$_3$)$_3$, Si(OC$_2$H$_5$)$_4$, (C$_6$H$_5$)Si(OCH$_3$)$_3$, (C$_6$H$_5$)$_2$Si(OCH$_3$)$_2$, (C$_6$H$_5$)(CH$_3$)Si(OCH$_3$)$_2$, (C$_6$H$_5$)Si(OC$_2$H$_5$)$_3$, (C$_6$H$_5$)$_2$Si(OC$_2$H$_5$)$_2$, (C$_6$H$_5$)(CH$_3$)Si(OC$_2$H$_5$)$_2$, (n—C$_3$H$_7$)Si(OC$_2$H$_5$)$_3$, (CH$_3$)Si(OC$_3$H$_7$)$_3$, (C$_6$H$_5$)(CH$_2$)Si(OC$_2$H$_5$)$_3$, Si(OC$_2$H$_5$)$_3$Cl, Si(OCH$_3$)$_2$Cl$_2$, Si(O—iC$_3$H$_7$)Cl$_3$,

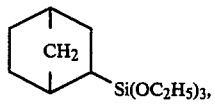

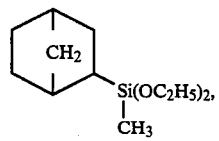

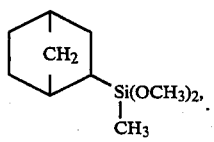

(CH$_3$)$_3$C—Si(OCH$_3$)$_2$,     HC(CH$_3$)$_2$
                                   |
                                   (CH$_3$)$_3$C—Si(OCH$_3$)$_2$,

CH$_3$                              CH$_3$
|                                   |
(CH$_3$)$_3$C—Si(OC$_2$H$_5$)$_2$,  (C$_2$H$_5$)$_3$C—Si(OCH$_3$)$_2$,

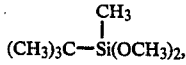

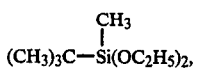

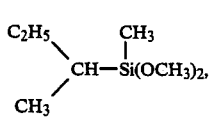

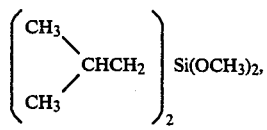

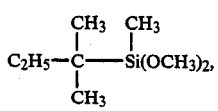

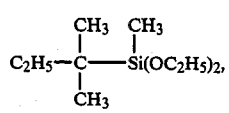

(CH$_3$)$_3$C—Si(OCH$_3$)$_3$,     (CH$_3$)$_3$C—Si(OC$_2$H$_5$)$_3$, (C$_2$H$_5$)$_3$C—Si(OC$_2$H$_5$)$_3$ and

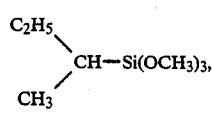

Compounds of group B: halogen containing compounds such as boron trichloride, boron tribromide, aluminum trichloride, ethylaluminum dichloride, ethylaluminum sesquichloride, diethylaluminum chloride, carbonyl chloride, carbon tetrachloride, chloroform, methylene chloride, methyl iodide, ethyl bromide, n-butyl chloride, ethylene dichloride, trichloroethane, acetic acid chloride, benzoyl chloride, silicon tetrachloride, methyl-trichlorosilane, dimethyldichlorosilane, trichlorosilane, ethoxytrichlorosilane, stannic chloride, phosphorus, pentachloride, phosphorus trichloride phosphorus oxytrichloride, ethyl dichlorophosphite, phenylphosphonic dichloride, thionyl chloride, sulfonyl chloride, chlorine, bromine, iodine, iodine trichloride, iron trichloride, titanium tetrachloride, titanium trichloride, trichlorobutoxyzirconium, dichlorodibutoxyzirconium, vanadium tetrachloride, vanadium trichloride and vanadium oxytrichloride.

Compounds of group C: boric esters such as trimethyl borate, triethyl borate, tripropyl borate and triphenyl borate; aluminum alkoxides such as diethylaluminum methoxide, diethylaluminum ethoxide, diethylaluminum butoxide, diethylaluminum phenoxide, diisobutylaluminum ethoxide, ethylaluminum diethoxide, aluminum triethoxide, aluminum triisopropoxide, aluminum tri-sec-butoxide and aluminum triphenoxide; ethers such as diethyl ether, diisobutyl ether, diisoamyl ether, diphenyl ether, tetrahydrofuran, dimethyl dimethoxymethane, diethyl dimethoxymethane, diphenyl dimethoxymethane, phenyl methyl dimethoxymethane, t-butyl dimethoxymethane, diphenyl diethoxymethane and dimethyl diphenoxymethane; silicic acid esters such as tetramethyl silicate, tetraethyl silicate, tetrabutyl silicate, tetraphenyl silicate, methyl trimethoxysilane, methyl triethoxysilane, ethyl triethoxysilane, octyl triethoxysilane, phenyl trimethoxysilane, phenyl triethoxysilane, vinyl trimethoxysilane, vinyl triethoxysilane, dimethyl dimethoxysilane, dimethyl diethoxysilane, diphenyl dimethoxysilane, diphenyl diethoxysilane, phenyl methyl dimethoxysilane, t-butyl methyl dimethoxysilane, phenyl t-butyl dimethoxysilane, norbornyl methyl dimethoxysilane, phenyl norbornyl dimethoxysilane, trimethyl methoxysilane, triphenyl ethoxysilane and chlorotrimethoxysilane; phosphorous esters such as trimethyl phosphite, tributyl phosphite, trioctyl phosphite, tridodecyl phosphite, trioleyl phosphite, dimethyl methylphosphite, diethyl methylphosphite, diethyl phenylphosphite, ethyl dimethylphosphite, methyl diethylphosphite and methyl diphenylphosphite; titanium alkoxides such as tetraethoxytitanium, tetraisopropoxytitanium, tetrabutoxytitanium, tetra-2-ethyl-hexoxytitanium, tributoxy-chlorotitanium and dibutyldichlorotitanium; and zirconium alkoxides such as tetraethoxyzirconium, tetrabutoxyzirconium, tetraoctoxy zirconium, tributoxychlorozirconium and dibutyldichlorozirconium.

Among specific examples mentioned above, the following is especially preferable.

Compounds of group A:
boric alkyl esters and alkoxyaluminum, especially B(OCH$_3$)$_3$ and B(OC$_2$H$_5$)$_3$;

Compounds of group B:
aluminum halides, titanium halides, ziconium halides, methane halides and silicon halides, especially AlCl$_3$, TiCl$_4$, ZrCl$_4$, CHCl$_3$ and SiCl$_4$;

Compounds of group C;
alkoxyzirconium, alkoxytitanium, alkoxysilicon, alkoxycarbon and alkoxyaluminum, especially Ti(OC$_4$H$_9$)$_4$, Zr(OC$_4$H$_9$)$_4$ and Si(OC$_2$H$_5$)$_4$.

When one or more of the compounds of group A is used as Component C, control of molecular weight of product polymer can be achieved, especially, larger molecular weight or product polymer can be obtained. In case of polypropylene, for example, polymer having average molecular weight of about 2,000,000 can be produced. When one or more of the compounds of group A is used, there is tendency to narrow the range of molecular weight distribution.

When one or more of the compounds of group B is used, the range of molecular weight distribution can be widened.

When one or more of the compounds of group C is used, production of low crystalline byproduct can be inhibited, and in case of copolymerization of ethylene and propylene, propylene copolymers in which the molecular weight of a propylene/ethylene copolymer moiety and/or that of a polyethylene moiety is increased of high rigidity and high impact strength, especially propylene/ethylene block copolymers can be obtained.

In addition, the copolymer powder obtained is less sticky and thus maintenance problem caused by aggregation and adhesion of the powder particles can be presented.

Furthermore, since the molecular weight of a crystalline polypropylene moiety can be decreased, fluidity of polymer product, in terms, for example, of spiral flow, can be improved.

Although the amount used for Components A, B and C can be increased or decreased as long as the effect of the invention is obtained, the following range is generally preferable. Molar ratio of Al in Component B to Ti in Component A, Al/Ti, is in the range of 1–1,000, more preferably 10–300.

Component C may be used in the range of 0.001–10 of molar ratio to Component B, more preferably 0.01–5.

Component C may be used in 0.01–1 of molar ratio to Component B, when the Component C is selected from the compounds of group A.

Component C is usually used in combination with Components A and B at the beginning of olefin polymerization. It, however, can be added at the end of the first stage or at the second stage if there are many steps in the polymerization process.

Use of the Catalyst/Polymerization

The catalyst of the present invention is used for not only slurry polymerization but also liquid phase solvent-free polymerization, solution polymerization or gas phase polymerization. Furthermore, the catalyst of the present invention can be used for continuous polymerization, batchwise polymerization or polymerization including preliminary polymerization.

In case of the slurry polymerization, there can be used as the polymerization solvent saturated aliphatic hydrocarbons and aromatic hydrocarbons such as hexane, heptane, cyclohexane, benzene, toluene and mixtures thereof. The polymerization temperature is room temperature to about 200° C., preferably 50° to 150° C., more preferably 55° to 95° C., and the polymerization pressure is atmospheric pressure to about 100 Kg/cm$^2$, preferably 1 to 50 Kg/cm$^2$. Hydrogen can be used for adjusting the molecular weight of the polymer to be produced.

The catalysts in accordance with the present invention can be used for polymerization of propylene or a mixture of propylene and ethylene in at least two stages to produce propylene polymers, especially copolymers, more particularly block copolymers.

A propylene/ethylene block copolymer can be prepared by conducting at least the following two stages (1) and (2) in two stages in the presence of the above-mentioned catalyst of the present invention, preferably in the order of the stage (1) to the stage (2).

Stage (1)

Propylene alone or a propylene/ethylene mixture having an ethylene content of up to 5% by weight, preferably up to 0.5% by weight, is supplied to the polymerization system where the above-mentioned catalyst is present and the polymerization is carried out in a single step or multiple steps to form a polymer in an amount corresponding to 50 to 95% by weight of the total polymerization amount.

In stage (1), if the ethylene content in the propylene/ethylene mixture exceeds the above-mentioned upper limit, the bulk density of the final copolymer is reduced and the amount of a low crystallinity polymer formed as a by-product is increased. Furthermore, if the polymerization quantity is below the above-mentioned range, similar phenomena result. If the polymerization ratio exceeds the above-mentioned range, the amount of a low crystallinity polymer formed as a by-product is reduced, but hardly any improvement of the impact strength, which is the object to be attained by formation of the block copolymer, is attained.

The polymerization temperature of stage (1) is 30°–95° C., preferably 60° to 90° C., and the polymerization pressure is about 1 to about 40 Kg/cm$^2$.

In order to impart good flowability to the final polymer, it is preferred that a molecular weight modifier be used in stage (1). Hydrogen is a preferred molecular weight modifier.

Stage (2)

Subsequently to stage (1), a propylene/ethylene mixture having an ethylene content of 20 to 100% by weight is introduced and is polymerized in a single step or multiple steps to form a polymer in an amount corresponding to 5 to 50% by weight of the amount of the total polymer.

If the polymerization quantity in stage (2) is below the above-mentioned range, the impact resistance is reduced, and if the polymerization quantity exceeds the above-mentioned range, the amount of a low crystallinity polymer formed as a by-product is drastically increased and the viscosity of the polymerization solvent is increased to cause operating trouble.

Other comonomer can be present in stage (2). For example, there can be mentioned α-olefins such as 1-butene, 1-pentane, 1-hexene and 4-methylpentene-1.

The polymerization temperature in stage (2) is 30° to 90° C., preferably 50° to 80° C., and the polymerization pressure is about 1 to about 40 Kg/cm$^2$.

It is preferred that when the stage (1) is changed over to stage (2), the propylene gas or propylene/ethylene mixture gas and the hydrogen gas be purged and stage (2) be then conducted.

A molecular weight modifier can be used in stage (2) according to need. For example, in the case where the impact resistance of the fianl polymer is important, it is preferred that the polymerization be carried out substantially in the absence of a molecular weight modifier. On the other hand, in the case where the transparency, gloss and prevention of whitening are important, it is preferred that the polymerization be carried out in the presence of a molecular weight modifier.

The production of the block copolymer according to the above said two stage procedure can be carried out batchwise, continuously or semi-batchwise. For example, there can be adopted a process in which the polymerization is carried out in a liquid medium of an inert hydrocarbon solvent, such as heptene, a process in which the monomer to be polymerized is used as the liquid medium, a process in which no medium is used but gaseous monomers are polymerized, and a process comprising two or more of the foregoing processes in combination.

The olefin polymerized by the catalyst system of the present invention is represented by the following general formula:

$$R-CH=CH_2$$

wherein R stands for a hydrogen atom or a hydrocarbon radical having 1 to 10 carbon atoms, which can have a branched group.

As specific examples, there can be mentioned ethylene, propylene, butene-1, pentene-1, hexene-1 and 4-methylpentene-1, and ethylene and propylene are preferred. Ethylene may be copolymerized with up to 50% by weight, preferably up to 20% by weight, of an olefin as described above, and propylene may be copolymerized with up to 50% by weight of an olefin as described above, especially ethylene. Furthermore, copolymerization with other copolymerizable monomer (for example, vinyl acetate or a diolefin) may be carried out.

EXAMPLES

The present invention will now be described in detail with reference to the following examples that by no means limit the scope of the invention.

EXAMPLE 1

[Preparation of Component (A)]

A ball mill having a volume of 0.4 liter whose inside was sufficiently dried and was substituted by nitrogen was filled with 40 pieces of stainless steel balls having a diameter of 12 mm, and 30 of $MgCl_2$ and 23.3 ml of diheptyl phthalate were introduced into the ball mill and pulverized for 48 hours by the rotating ball mill. After completion of the pulverization, the mixed pulverized composition was taken out from the mill in a dry box, and 26.4 g of the pulverized composition was introduced into a sufficiently nitrogen-substituted flask and 25 ml of n-heptane and 75 ml of $TiCl_4$ were introduced into the flask. Reaction was carried out at 100° C. for 3 hours. After completion of the reaction, the reaction product was sufficiently washed with n-heptane. A part of the solid component obtained was sampled and analyzed, and it was found that the solid product obtained was a solid component comprising titanium, magnesium and the halogen as essential ingredients and having a Ti content of 3.12% by weight.

A stainless steel vessel provided with a stirrer and a temperature-controlling device and having an inner volume of 1.5 liters was charged with 500 ml of sufficiently dehydrated and deoxygenated n-heptane, 4.2 g of triethylaluminum and 20 g of the obtained solid component. While the temperature in the stirred vessel was maintained at 20° C., propylene was introduced at a constant rate and propylene was polymerized for 30 minutes. After termination of the polymerization, the reaction product was sufficiently washed with n-heptane. A part of the reaction product was sampled, the polymerized amount of propylene was examined and it was found that in the component (i) obtained, propylene was polymerized in an amount of 0.97 g per g of the solid component.

A flask whose inside was fully substituted by nitrogen was charged with 50 ml of purified n-heptane, and 5 g of the component (i) obtained was introduced and then, 0.34 ml of $(CH_3)_3CSi(CH_3)(OCH_3)_2$ as the silicon compound as the component (ii) was introduced. The contact was effected at 30° C. for 2 hours. After termination of the contact, the contact product was sufficiently washed with n-heptane to obtain the Component (A).

[Polymerization of Propylene]

A stainless steel autoclave provided with a stirrer and a temperature-controlling device and having an inner volume of 1.5 liters was charged with 500 ml of sufficiently dehydrated and deoxygenated n-heptane, 125 mg of triethyl aluminum as the Component (B), 53.2 mg of $Al(OC_2H_5)_3$ as the Component (C) and 15 mg, exclusive of the polymer formed by the preliminary polymerization, of the above-mentioned Component (A).

Then, 60 ml of hydrogen was introduced into the autoclave, and the temperature and pressure were elevated. Polymerization of propylene was carried out under conditions of a polymerization pressure of 5 Kg/cm²G, a polymerization temperature of 75° C. and a polymerization time of 2 hours. After termination of the polymerization, the polymer slurry obtained was separated by filtration, and the polymer was dried to obtain 104.5 g of a dry polymer. Separately, 0.91 g of a polymer was recovered from the filtrate. From the results of the boiling heptane extraction test, it was found that the total polymer I.I, which is hereinafter referred to as "T-I.I", was 97.6% by weight. MFR was 1.1 g/10 min and the bulk density of the polymer was 0.40 g/cc.

EXAMPLE 2

[Preparation of Component (A)]

A flask whose inside was sufficiently substituted by nitrogen was charged with 200 ml of dehydrated and deoxygenated n-heptane, and 0.4 mole of $MgCl_2$ and 0.8 mole of $Ti(O-n-C_4H_9)_4$ were introduced and reaction was carried out at 95° C. for 2 hours. After completion of the reaction, the temperature was lowered at 40° C. and 48 ml of methylhydropolysiloxane (20 cSt) was introduced. Reaction was carried out for 3 hours. The solid component formed was washed with n-heptane.

Then, in the same manner as described in Example 1, a flask whose inside was sufficiently substituted by nitrogen was charged with 50 ml of purified n-heptane, and the solid component synthesized as shown above was introduced in an amount of 0.24 mole as calculated as Mg. Then, a mixture of 25 ml of n-heptane and 0.4 mole of $SiCl_4$ was introduced into the flask at 30° C. over a period of 60 minutes and reaction was carried out at 90° C. for 3 hours. Then, a mixture of 25 ml of n-heptane and 0.016 mole of phthaloyl chloride was charged into the flask at 90° C. over a period of 30 minutes, and reaction was carried out at 90° C. for 1 hour. After termination of the reaction, the reaction product was washed with n-heptane. Then, 0.24 milli mole of $SiCl_4$ was introduced into the flask and reaction was carried out at 100° C. for 3 hours. After completion of the reaction, the reaction product was sufficiently washed with n-heptane. The reaction product was used as the solid component for the production of the solid component (i).

The component (i) was prepared in the same manner as described in Example 1 except that the so-obtained solid component was used. In the obtained component (i), the amount of preliminarily polymerized propylene was 1.02 g per g of the solid component.

The component (i) was contacted with the component (ii) in the same manner as described in Example 1. After termination of the contact, the contact product was sufficiently washed with n-heptane to obtain the Component (A).

[Polymerization of Propylene]

Polymerization was carried out under the same conditions as described in Example 1 except that the Component (C) was changed to 16 mg of $B(OC_2H_5)_3$.

As a result, 174.2 g of a polymer was obtained, whose MFR was 1.0 g/10 min, T-I.I was 98.9% by weight and the bulk density was 0.47 g/cc.

EXAMPLE 3

The component (i) was contacted with the component (ii) in the same manner as described in Example 1 except that the silicon compound used as the component (ii) was changed to 2.5 ml of $(CH_3)(t-C_4H_9)Si(OC_2H_5)_2$ and the so-obtained component (i) was used. After termination of the contact, the contact product was sufficiently washed with n-heptane to obtain the Component (A).

[Polymerization of Propylene]

Polymerization of propylene was carried out in the same manner as described in Example 1 except that the Component (C) was changed to 84 mg of $Zr(OC_4H_9)_4$ and polymerization temperature of 70° C. As a result, 88.7 g of a polymer was obtained, whose T-I.I was 97.1% by weight, MFR was 1.4 g/10 min, and the bulk density was 0.46 g/cc.

EXAMPLES 4 THROUGH 7

A catalyst was prepared and propylene was polymerized in the same manner as described in Example 2 except that in the polymerization of propylene, a compound shown in Table 1 was used instead of $B(OC_2H_5)_3$ used in Example 2 as the Component (C). The results obtained are shown in Table A1.

TABLE A1

| | Component (C) | | Polymer | T-I.I | MFR | Polymer bulk |
|---|---|---|---|---|---|---|
| Example | Name | Quantity (mg) | Yield (g) | (wt. %) | (g/10 min.) | density (g/cc) |
| 4 | $Mg(OC_2H_5)_2$ | 24.8 | 168.3 | 98.7 | 1.1 | 0.46 |
| 5 | $B(OCH_3)_3$ | 11.4 | 184.4 | 98.9 | 0.8 | 0.48 |
| 6 | $Al(OC_2H_5)Cl_2$ | 31.4 | 179.5 | 98.2 | 1.2 | 0.45 |
| 7 | $Ca(OC_2H_5)_2$ | 42.8 | 158.6 | 98.3 | 1.3 | 0.45 |

[Preparation of Component (A)]

A flask whose inside was sufficiently substituted by nitrogen was charged with 200 ml of dehydrated and deoxygenated n-heptane, and 0.1 mole of $MgCl_2$ and 0.2 mole of $Ti(O-n-C_4H_9)_4$ were introduced into the flask and reaction was carried out at 95° C. for 2 hours. After termination of the reaction, the temperature was lowered to 35° C., and 15 ml of 1,3,5,7-tetramethylcyclotetrasiloxane was introduced and reaction was carried out for 5 hours. The solid component formed was washed with n-heptane.

Then, a flask whose inside was sufficiently substituted by nitrogen was charged with 100 ml of n-heptane, and the solid component synthesized above was introduced into the flask in an amount of 0.03 mole as calculated as the Mg atom. Then, 0.06 mole of $SiCl_4$ was introduced at 20° C. over a period of 30 minutes and reaction was carried out at 50° C. for 3 hours. After termination of the reaction, the reaction product was washed with n-heptane to obtain the solid component for the production of the component (i).

EXAMPLES 8 THROUGH 11

Propylene was polymerized in the same manner as described in Example 3 except that in the preparation of Component (A), a compound shown in Table 2 was used as the silicon compound as the component (ii). The results obtained are shown in Table A2.

COMPARATIVE EXAMPLES 1 AND 2

Polymerization was conducted according to the procedure as set forth in Examples 2 and 3 except for the elimination of Component (C). The results obtained are set forth in Table A3.

EXAMPLES 12 AND 13, AND COMPARATIVE EXAMPLE 3

Propylene was polymerized in the same manner as described in Example 5 except that the conditions as set forth in Table A4 were used instead thereby to produce ultra higher molecular polypropylene. The results obtained are set forth in Table A4.

TABLE A2

| | Component (ii) | | | | | Polymer |
|---|---|---|---|---|---|---|
| Example | Name | Quantity (ml) | Polymer Yield (g) | T-I.I (wt. %) | MFR (g/10 min.) | bulk density (g/cc) |
| −8 | $(CH_3)_3CSi(OCH_3)_3$ | 1.5 | 87.4 | 97.0 | 1.5 | 0.45 |
| −9 | $(C_2H_5)_3CSi(OC_2H_5)_3$ | 2.1 | 86.3 | 97.1 | 1.6 | 0.46 |
| −10 | 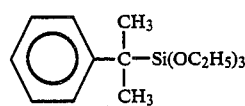 | 2.3 | 79.6 | 96.8 | 1.5 | 0.45 |

TABLE A2-continued

| Example | Component (ii) Name | Quantity (ml) | Polymer Yield (g) | T-I.I (wt. %) | MFR (g/10 min.) | Polymer bulk density (g/cc) |
|---|---|---|---|---|---|---|
| −11 | (bicyclic structure with =CH₂ and Si(OCH₃)₂(CH₃)) | 2.0 | 88.4 | 96.7 | 1.6 | 0.45 |

TABLE A3

| Example | Component (C) Name | Quantity (mg) | Polymer Yield (g) | T-I.I (wt. %) | MFR (g/10 min.) | Polymer bulk density (g/cc) |
|---|---|---|---|---|---|---|
| 2 | $B(OC_2H_5)_3$ | 16 | 174.2 | 98.8 | 1.0 | 0.47 |
| (Comp. Exam. 1) | — | — | 169.3 | 98.5 | 2.5 | 0.46 |
| 3 | $Zr(OC_4H_9)_4$ | 84 | 88.7 | 97.1 | 1.4 | 0.46 |
| (Comp. Exam. 2) | — | — | 98.4 | 98.1 | 4.4 | 0.45 |

TABLE A4

| Example | Component (C) ( ) Quantity | Component (B) ( ) Quantity | Polymerization temp. (°C.) | H₂ (ml) | Polymer yield (g) | Polymer bulk density (g/cc) | Mw*¹ (× 10⁴) |
|---|---|---|---|---|---|---|---|
| 12 | $B(OCH_3)_3$ (11.4 mg) | $(C_2H_5)_3Al$ (100 mg) | 60 | none | 86 | 0.48 | 188 |
| 13 | $B(OC_2H_5)_3$ (32 mg) | $(i\text{-}C_4H_9)_3Al$ (217 mg) | 65 | none | 79 | 0.45 | 211 |
| Comp. Exam. 3 | none | $(i\text{-}C_4H_9)_3Al$ (217 mg) | 65 | none | 76 | 0.44 | 101 |

*¹Mw: Determined by GPC

EXAMPLE 14

[Preparation of Component (A)]

A flask sufficiently substituted by nitrogen was charged with 200 ml of dehydrated and deoxygenated n-heptane, and 0.4 mole of MgCl₂ and 0.8 mole of Ti(O—n—C₄H₉)₄ were introduced into the flask and reaction was carried out at 95° C. for 2 hours. After termination of the reaction, the temperature was lowered to 40° C., and 48 ml of methylhydropolysiloxane (20 cSt) was introduced into the flask and reaction was carried out for 3 hours. The solid component formed was washed with n-heptane. Then, a flask sufficiently substituted with nitrogen was charged with 50 ml of n-heptane purified in the same manner as described above, and the so-synthesized solid component was charged in the flask in an amount of 0.24 mole as calculated as the Mg atom. Then, a mixture of 25 ml of n-heptane and 0.4 mole of SiCl₄ was introduced into the flask at 30° C. over a period of 60 minutes and reaction was carried out at 90° C. for 3 hours. Then, a mixture of 25 ml of n-heptane and 0.016 mole of phthaloyl chloride was introduced into the flask at 90° C. over a period of 30 minutes and reaction was carried out at 90° C. for 1 hour. After termination of the reaction, the reaction product was washed with n-heptane. Then, 0.24 milli mole of SiCl₄ was introduced and reaction was carried out at 100° C. for 3 hours. After termination of the reaction, the reaction product was sufficiently washed with n-heptane to obtain a component (i) for the production of the Component (A).

A stainless steel vessel provided with a stirrer and a temperature-controlling device and having an inner volume of 1.5 liters was charged with 500 ml of sufficiently dehydrated and deoxygenated n-heptane, 4.2 g of triethylaluminum and 20 g of the obtained solid component. While the temperature in the stirred vessel was maintained at 20° C., propylene was introduced at a constant rate and propylene was polymerized for 30 minutes. After termination of the polymerization, the reaction product was sufficiently washed with n-heptane. A part of the reaction product was sampled, the polymerized amount of propylene was examined and it was found that in the component (i) obtained, propylene was polymerized in an amount of 1.02 g per g of the solid component.

A flask whose inside was fully substituted by nitrogen was charged with 50 ml of purified n-heptane, and 5 g of the component (i) obtained was introduced and then, 0.81 ml of $(CH_3)_3CSi(CH_3)(OCH_3)_2$ as the silicon compound as the component (ii) was introduced. The contact was effected at 30° C. for 2 hours. After termination of the contact, the contact product was sufficiently washed with n-heptane to obtain the Component (A).

[Polymerization of Propylene]

A stainless steel autoclave provided with a stirrer and a temperature-controlling device and having an inner volume of 1.5 liters was charged with 500 ml of sufficiently dehydrated and deoxygenated n-heptane, 125 mg of triethyl aluminum as the Component (B), 14.6 mg AlCl₃ as the Component (C) and 15 mg, exclusive of the polymer formed by the preliminary polymerization, of the above-mentioned Component (A).

Then, 60 ml of hydrogen was introduced into the autoclave, and the temperature and pressure were elevated. Polymerization of propylene was carried out under conditions of a polymerization pressure of 5 Kg/cm²G, a polymerization temperature of 75° C. and a polymerization time of 2 hours. After termination of the polymerization, the polymer slurry obtained was separated by filtration, and the polymer was dried to obtain 169.8 g of a dry polymer. Separately, 1.2 g of a polymer was recovered from the filtrate. From the results of the boiling heptane extraction test, it was found that the total polymer I.I, which is hereinafter referred to as "T-I.I", was 98.6% by weight. MFR was 2.5 g/10 min and the bulk density of the polymer was 0.45 g/cc. The value Q which is defined by an equation: Q=Mw/Mn where Mw means a weight-average molecular weight and Mn means a number-average molecular weight, and which is concerned with a molecular weight distribution of the polymer produced was determined to be 7.8.

EXAMPLE 15

[Preparation of Component (A)]

A flask whose inside was sufficiently substituted by nitrogen was charged with 200 ml of dehydrated and deoxygenated n-heptane, and 0.1 mole of $MgCl_2$ and 0.2 mole of $Ti(O—n—C_4H_9)_4$ were introduced and reaction was carried out at 95° C. for 2 hours. After completion of the reaction, the temperature was lowered at 35° C. and 15 ml of 1,3,5,7-tetramethylcyclotetrasiloxane was introduced. Reaction was carried out for 5 hours. The solid component formed was washed with n-heptane.

Then, a flask whose inside was sufficiently substituted by nitrogen was charged with 100 ml of purified n-heptane, and the solid component synthesized as shown above was introduced in an amount of 0.03 mole as calculated as Mg. Then, 0.06 mole of $SiCl_4$ was introduced into the flask at 20° C. over a period of 30 minutes and reaction was carried out at 50° C. for 3 hours. After termination of the reaction, the reaction product was washed with n-heptane. The reaction product was used as the solid component for the production of the solid component (i).

The component (i) was contacted with the component (ii) in the same manner as described in Example 14 except that the silicon compound used as the component (ii) was changed to 1.9 ml of $(CH_3)(t—C_4H_9)Si(OC_2H_5)_2$. After termination of the contact, the contact product was sufficiently washed with n-heptane to obtain the Component (A).

[Polymerization of Propylene]

Polymerization was carried out under the same conditions as described in Example 14 except that the Component (C) was changed to 29.5 mg of $SiCl_4$ and the polymerization temperature was changed to 70° C.

As the result, 79.6 g of a polymer was obtained, whose MFR was 4.1 g/10 min, T-I.I was 98.1% by weight, the bulk density was 0.44 g/cc and Q was 7.6.

EXAMPLES 15', 16–17

Propylene was polymerized in the same manner as described in Example 14 except for the use as Component (C) of the compound set forth in Table B1. The results obtained are set forth in Table B1.

COMPARATIVE EXAMPLES 4 AND 5

Polymerization was conducted according to the procedure as set forth in Examples 14 and 15 except for the elimination of Component (C). The results obtained are set forth in Table B2.

TABLE B1

| Example | Component (C) Name | Component (C) Q'ty (mg) | Polymer yield (g) | T-I.I (wt. %) | MFR (g/10 min.) | Polymer bulk density (g/cc) | Q value |
|---|---|---|---|---|---|---|---|
| 15' | $TiCl_4$ | 20.7 | 163 | 98.3 | 2.6 | 0.44 | 7.7 |
| 16 | $CHCl_3$ | 13.2 | 169 | 98.4 | 2.7 | 0.45 | 7.9 |
| 17 | $ZrCl_4$ | 25.5 | 161 | 98.3 | 2.6 | 0.46 | 7.8 |
| 18 | $FeCl_3$ | 17.8 | 162 | 98.1 | 2.5 | 0.45 | 7.8 |

TABLE B2

| Example | Component (C) Name | Component (C) Q'ty (mg) | Polymer yield (g) | T-I.I (wt. %) | MFR (g/10 min.) | Polymer bulk density (g/cc) | Q value |
|---|---|---|---|---|---|---|---|
| 14 | $AlCl_3$ | 14.6 | 171 | 98.6 | 2.5 | 0.45 | 7.8 |
| Comp. Exam. 4 | — | — | 169.3 | 98.5 | 2.5 | 0.46 | 6.1 |
| 15 | $SiCl_4$ | 29.5 | 79.6 | 98.1 | 4.1 | 0.44 | 7.6 |
| Comp. Exam. 5 | — | — | 98.4 | 98.1 | 4.4 | 0.45 | 5.8 |

EXAMPLE 19

[Preparation of Component (A)]

A flask sufficiently substituted by nitrogen having a capacity of 1 liter was charged with 200 ml of dehydrated and deoxygenated n-heptane, and 0.4 mole of $MgCl_2$ and 0.8 mole of $Ti(O—n—C_4H_9)_4$ were introduced and reaction was carried out at 95° C. for 2 hours. After termination of the reaction, the temperature was lowered to 40° C., and 48 ml of methylhydropolysiloxane (20 cSt) was introduced and reaction was carried out for 3 hours. After completion of the reaction, the reaction product was washed with n-heptane (which is hereinafter referred to as "Intermediate-I").

Then, a flask sufficiently substituted by nitrogen was charged with 50 ml of n-heptane purified in the same manner as described above, and the above reaction product was introduced in an amount of 0.24 mole as calculated as the Mg atom. Then, 0.4 mole of $SiCl_4$ was introduced into the flask at 30° C. over a period of 30 minutes, and reaction was carried out at 70° C. for 3 hours. After termination of the reaction, the reaction product was washed with n-heptane.

A quantity of 0.02 mole of triethyl borate diluted with 25 ml of n-heptane was then introduced into the flask at 70° C. over 30 minutes, and was caused to react for further 30 minutes. The product was washed with n-heptane.

Then, a mixture of 25 ml of n-heptane and 0.016 mole of phthaloyl chloride was introduced into the flask at 70° C. over a period of 30 minutes, and reaction was carried out at 70° C. for 1 hour. After completion of the reaction, the reaction product was washed with n-heptane.

Finally, 0.24 mole of $SiCl_4$ was introduced into the flask and reaction was carried out at 95° C. for 6 hours. After termination of the reaction, the reaction product was sufficiently washed with n-heptane.

In the so-obtained solid component, the Ti-content was 2.27% by weight.

Then, a flask sufficiently substituted with nitrogen was charged with 25 ml of sufficiently purified n-heptane, and 5 g of the so-obtained solid component was charged and Si/Ti=4.5 (atomic ratio) of t-butylmethyldimethoxysilane was introduced. Contact reaction was carried out at 50° C. for 90 minutes, and the contact product was sufficiently washed with n-heptane to obtain a Component (A).

[Copolymerization of Propylene]

An autoclave equipped with a stirrer and having an inner capacity of 1.5 liters, the inner atmosphere of which was sufficiently substituted with propylene, was charged with 500 ml of sufficiently dehydrated and deoxygenated n-heptane, and 25 mg, as calculated as the solid component, of the Component (A) and 125 mg of triethylaluminum as the Component (B) were introduced at 75° C. in a propylene atmosphere.

The the first stage of polymerization, 220 ml of hydrogen was added and propylene was introduced at a constant rate of 0.932 g/min at 75° C.

After the elapse of 3 hours, introduction of propylene was stopped, and polymerization was continued at 75° C. When the pressure became 2 $Kg/cm^2G$, 1/10 of the product was sampled. The gas phase was purged until the pressure was reduced to 0.2 $Kg/cm^2G$.

The the second stage of polymerization, 92.1 mg of $ZrCl_4$ as Component (C) was introduced, and then propylene and ethylene were introduced at constant rates of 0.0546 g/min and 0.218 g/min, respectively, at 60° C. for 1.5 hours.

After termination of the polymerization, the gas phase was purged, and the slurry was filtered and dried to obtain 153.7 g of a polymer. Separately, 2.13 g of a low crystallinity polymer (PAP) formed as a by-product was obtained by drying the filtrate. MFR of the polymer formed was 2.49 g/10 min and the bulk density (B.D.) was 0.45 g/cc.

Furthermore, a polymer having MFR of 5.77 g/10 min was obtained by drying the intermediate sample.

EXAMPLE 20, COMPARATIVE EXAMPLES 6 AND 7

The procedures for production of a solid catalyst component and copolymerization of propylene as set forth in Example 19 were followed except for the substitution of the silicon compound set forth in Table B3 for t-butyldimethoxysilane as Component (A) in the production of solid catalyst Component (A). The results obtained are set forth in Table B3.

EXAMPLES 21 AND 22

The procedures for production of a solid catalyst component and copolymerization of propylene were followed except for substitution of the compounds set forth in Table B3 for the Component (C). The results obtained are set forth in Table B3.

In the data set forth in Table B3 et seq., the MFR for the 2nd step, indicated as "MFR-2", is an estimation according to the following equation:

$$MFR\text{-}2 = \exp\left\{ \frac{(a + b) \times \ln(MFR\text{-}A) - a \times \ln(MFR\text{-}1)}{b} \right\}$$

where

MFR-1: an MFR of a polymer produced in the first stage;
MFR-2: an MFR of a polymer produced in the second stage estimated by the calculation by the equation;
MFR-A: an MFR of a total polymer produced;
a: a quantity of a polymer produced in the first stage; and
b: a quantity of a polymer produced in the second stage.

The above formula is obtained from the equation:

$$a \times \ln(MFR\text{-}1) + b \times \ln(MFR\text{-}2) = (a+b) \times \ln(MFR\text{-}A)$$

TABLE B3

| | Cat. Components | | | | Polymerization result | | | | | | |
|---|---|---|---|---|---|---|---|---|---|---|---|
| | Si-compd. in Component (A) | | Component (C) | | | PAP pro-duced (wt./%) | MFR (g/10 min) | | | | |
| Example | Name | Si/Ti mole ratio | Name | M/Al mole ratio | Activity (g-pp/g-cat) | | Inter-mediate sample | Polymer pro-duced | MFR-2 | B.D. (g/cc) | Ethylene content (wt. %) |
| 19 | (a) | 4.5 | $ZrCl_4$ | 0.4 | 6930 | 1.37 | 5.77 | 2.49 | $5.3 \times 10^{-3}$ | 0.451 | 5.3 |
| 20 | (b) | 4.5 | $ZrCl_4$ | 0.4 | 6940 | 1.68 | 5.51 | 2.47 | $8.6 \times 10^{-3}$ | 0.460 | 5.4 |
| Comp. Exam. 6 | (c) | 4.5 | $ZrCl_4$ | 0.4 | 6760 | 3.15 | 12.61 | 8.22 | $4.3 \times 10^{-1}$ | 0.386 | 5.2 |
| Comp. Exam. 7 | (c) | 4.5 | none | — | 6820 | 4.20 | 13.30 | 9.50 | $6.1 \times 10^{-1}$ | 0.378 | 5.3 |
| 21 | (a) | 4.5 | $TiCl_4$ | 0.2 | 6870 | 1.58 | 5.30 | 2.45 | $6.4 \times 10^{-3}$ | 0.452 | 5.1 |
| 22 | (a) | 4.5 | $SiCl_4$ | 0.2 | 6970 | 1.60 | 6.02 | 2.65 | $9.2 \times 10^{-3}$ | 0.448 | 5.5 |

(a): $(CH_3)(t\text{-}C_4H_9)Si(OCH_3)_2$
(b): $(CH_3)(norbornyl)Si(OCH_3)_2$
(c): $(C_6H_5)_2Si(OCH_3)_2$

EXAMPLE 23

The Intermediate-I was prepared as described in Example 19.

Then, a flask sufficiently substituted by nitrogen was charged with 25 ml of n-heptane amply purified, and the Intermediate-I was introduced in an amount of 0.24 mole as calculated as the Mg atom. Then, 0.4 mole of SiCl₄ was introduced into the flask at 30° C. over a period of 30 minutes, and reaction was carried out at 90° C. for 3 hours. The reaction product was washed with n-heptane.

Then, a mixture of 25 ml of n-heptane and 0.016 mole of phthaloyl chloride was introduced into the flask at 70° C. over a period of 30 minutes, and reaction was carried out at 70° C. for 1 hour. After completion of the reaction, the reaction product was washed with n-heptane.

Finally, 5.0 g of PCl₅ was introduced into the flask and reaction was carried out at 95° C. for 6 hours. The reaction product was sufficiently washed with n-heptane.

In the so-obtained solid component, the Ti-content was 1.52 by weight.

Into a stainless-steel vessel of a capacity of 1.5 liters equipped with a stirring means and a temperature-controlling means was fed 500 ml of n-heptane amply dehydrated and deoxygenated, 4.2 g of triethylaluminum and 20 g of the solid product produced as described above. The temperature within the vessel was controlled at 20° C., and propylene was introduced at a constant velocity of 0.67 g/min. for 30 minutes. The product was washed with n-heptane, and was found to contain 0.86 g of polypropylene per gram of the solid catalyst component.

Then, a flask sufficiently substituted with nitrogen was charged with 50 ml of sufficiently purified n-heptane, and 5 g (as the solid catalyst) of the so-obtained solid catalyst was charged and Si/Ti=3 of t-butylmethyldimethoxysilane was introduced. Contact reaction was carried out at 50° C. for 90 minutes, and the contact product was sufficiently washed with n-heptane to obtain a Component (A).

[Copolymerization of Propylene]

Copolymerization of propylene was conducted as described in Example 19 except for the use as the catalyst Component (A) of 15 mg of the catalyst Component (A) produced as described above. The results obtained are set forth in Table B4.

EXAMPLE 24

The procedures for production of a solid catalyst component and copolymerization of propylene as set forth in Example 23 were followed except for the substitution as Component (C) of the compounds set forth in Table B4 for zirconium tetrachloride in the copolymerization of propylene. The results obtained are set forth in Table B4.

Then, a flask sufficiently substituted by nitrogen was charged with 100 ml of n-heptane amply purified, and the Intermediate-I was introduced in an amount of 0.24 mole as calculated as the Mg atom. Then, 0.48 mole of SiCl₄ was introduced into the flask at 20° C. over a period of 30 minutes, and reaction was carried out at 50° C. for 3 hours. After termination of the reaction, the reaction product was washed with n-heptane.

In the so-obtained solid component, the Ti-content was 4.60% by weight.

Preliminary polymerization was conducted as described in Example 23 except for the use of 500 ml of n-heptane, 3.8 g of triisobutylaluminum in place of triethylaluminum, 20 g of the solid component obtained hereinabove, a polymerization temperature of 15° C., and production of propylene at a velocity of 2.0 g/min. for 30 minutes. The product obtained was amply washed, and was found to contain 2.67 g of polypropylene per gram of the solid catalyst.

Then, a flask sufficiently substituted with nitrogen was charged with 50 ml of sufficiently purified n-heptane, and 5 g (as the solid catalyst) of the so-obtained solid catalyst was charged and Si/Ti=3 of t-butylmethyldimethoxysilane was introduced. Contact reaction was carried out at 50° C. for 90 minutes, and the contact product was sufficiently washed with n-heptane to obtain a Component (A).

[Copolymerization of Propylene]

An autoclave as used in Example 19 was charged with 500 ml of sufficiently dehydrated and deoxygenated n-heptane, and 15 mg of the Component (A) and 125 mg of triethylaluminum as the Component (B) and trichloro zirconium butoxide as the Component (C) were introduced in a propylene atmosphere.

The the first stage of polymerization, 220 ml of hydrogen was added and propylene was introduced at a constant rate of 0.932 g/min. at 70° C.

After the elapse of 3 hours, introduction of propylene was stopped, and polymerization was continued at 70° C. When the pressure became 2 Kg/cm²G, 1/10 of the product was sampled. The gas phase was purged until the pressure was reduced to 0.2 Kg/cm²G.

The second stage of polymerization, ethylene was introduced at a constant rate of 0.273 g/min at 60° C. for 1.5 hours.

After termination of the polymerization, the gas phase was purged, and the slurry was filtered and dried to obtain 154.4 g of a polymer. Separately, 1.53 g of a low crystallinity polymer (PAP) formed as a by-product was obtained by drying the filtrate. The activity of the catalyst corresponds to 11,600 g-polymer/g-solid

TABLE B4

| | Cat. Components | | | | Polymerization result | | | | | | |
|---|---|---|---|---|---|---|---|---|---|---|---|
| | Si-compd. in Component (A) | | Component (C) | | | PAP | MFR (g/10 min) | | | | |
| Example | Name | Si/Ti mole ratio | Name | M/Al mole ratio | Activity (g-pp/g-cat) | produced (wt./%) | Intermediate sample | Polymer produced | MFR-2 | B.D. (g/cc) | Ethylene content (wt. %) |
| 23 | (a) | 3 | ZrCl₄ | 0.4 | 11470 | 1.13 | 7.21 | 2.37 | $6.8 \times 10^{-4}$ | 0.470 | 5.6 |
| 24 | " | " | AlCl₃ | 0.3 | 11600 | 1.08 | 6.67 | 2.57 | $4.3 \times 10^{-3}$ | 0.465 | 5.6 |

(a): $(CH_3)(t-C_4H_9)Si(OCH_3)_2$

EXAMPLE 25

The Intermediate-I was prepared as described in Example 19.

component (A). MFR of the polymer formed was 2.29 g/10 min and the bulk density (B.D.) was 0.490 g/cc.

Furthermore, a polymer having MFR of 9.85 g/10 min was obtained by drying the intermediate sample.

The MFR of the polymer produced at the second stage, viz. MFR-2 was calculated to be $1.3 \times 10^{-4}$ g/10 min.

As shown in the above, the use of the catalyst in accordance with the present invention in a two-stage production of propylene copolymers results in an increase in the molecular weight of the polyethylene produced in the second stage. This in turn is followed by the fact that, the molecular weight of the crystalline polypropylene in the copolymer obtained can be lowered with the MFR of the polymer unchanged, whereby the flow properties of the polymer obtained, such as the spiral flow characteristic, are improved. Further, the polymer powder obtained is free from stickiness, and free of troubles due to agglomeration or conglutination of powder particles.

EXAMPLE 26

[Preparation of Component (A)]

A flask sufficiently substituted by nitrogen having a capacity of 1 liter was charged with 200 ml of dehydrated and deoxygenated n-heptane, and 0.4 mole of $MgCl_2$ and 0.8 mole of $Ti(O-n-C_4H_9)_4$ were introduced and reaction was carried out at 95° C. for 2 hours. After termination of the reaction, the temperature was lowered to 40° C., and 48 ml of methylhydropolysiloxane (20 cSt) was introduced and reaction was carried out at the temperature for 3 hours. After completion of the reaction, the reaction product was washed with n-heptane (which is hereinafter referred to as "Intermediate-I").

Then, a flask sufficiently substituted by nitrogen was charged with 50 ml of n-heptane purified in the same manner as described above, and the above reaction product was introduced in an amount of 0.24 mole as calculated as the Mg atom. Then, 0.4 mole of $SiCl_4$ was introduced into the flask at 30° C. over a period of 30 minutes, and reaction was carried out at 70° C. for 3 hours. After termination of the reaction, the reaction product was washed with n-heptane.

A quantity of 0.02 mole of triethyl borate diluted with 25 ml of n-heptane was then introduced into the flask at 70° C. over 30 minutes, and was caused to react for further 30 minutes. The product was washed with n-heptane.

Then, a mixture of 25 ml of n-heptane and 0.016 mole of phthaloyl chloride was introduced into the flask at 70° C. over a period of 30 minutes, and reaction was carried out at 70° C. for 1 hour. After completion of the reaction, the reaction product was washed with n-heptane.

Finally, 0.24 mole of $SiCl_4$ was introduced into the flask and reaction was carried out at 95° C. for 6 hours. After termination of the reaction, the reaction product was sufficiently washed with n-heptane. In the so-obtained solid component, the Ti-content was 1.87% by weight.

Then, a flask sufficiently substituted with nitrogen was charged with 25 ml of sufficiently purified n-heptane, and 5 g of the so-obtained solid component was charged and Si/Ti=4.5 of t-butylmethyldimethoxysilane was introduced. Contact reaction was carried out at 50° C. for 90 minutes, and the contact product was sufficiently washed with n-heptane to obtain a Component (A).

[Copolymerization of Propylene]

An autoclave equipped with a stirrer and having an inner capacity of 1.5 liters, the inner atmosphere of which was sufficiently substituted with propylene, was charged with 500 ml of sufficiently dehydrated and deoxygenated n-heptane, and 25 mg of the Component (A) and 125 mg of triethylaluminum as the Component (B) were introduced in a propylene atmosphere.

In the first stage of polymerization, 220 ml of hydrogen was added and propylene was introduced at a constant rate of 0.932 g/min at 75° C.

After the elapse of 3 hours, introduction of propylene was stopped, and polymerization was continued at 75° C. When the pressure became 2 $Kg/cm^2G$, 1/10 of the product was sampled. The gas phase was purged until the pressure was reduced to 0.2 $Kg/cm^2G$.

In the second stage of polymerization, 75.6 mg of $Zr(OC_4H_9)_4$ as Component (C) was introduced, and then propylene and ethylene were introduced at constant rates of 0.0546 g/min and 0.218 g/min, respectively, at 60° C. for 1.5 hours.

After termination of the polymerization, the gas phase was purged, and the slurry was filtered and dried to obtain 155.3 g of a polymer. Separately, 2.21 g of a low crystallinity polymer (PAP) formed as a by-product was obtained by drying the filtrate. MFR of the polymer formed was 2.19 g/10 min and the bulk density (B.D.) was 0.457 g/cc.

Furthermore, a polymer having MFR of 5.40 g/10 min was obtained by drying the intermediate sample.

EXAMPLE 27, COMPARATIVE EXAMPLE 8

The procedures for production of a solid catalyst component and copolymerization of propylene as set forth in Example 26 were followed except for the substitution of norbornylmethyldimethoxysilane or diphenyldimethoxysilane for the branched-chain hydrocarbyl silicon compound in the production of solid catalyst Component (A). The results obtained are set forth in Table C1.

EXAMPLES 28–30

The procedures for production of a solid catalyst component and copolymerization of propylene as set forth in Example 26 except for the substitution of the alkoxy compound set forth in Table C1 for the tetrabutoxyzirconium as Component (C).

The results obtained are set forth in Table C1.

TABLE C1

| | Cat. Components | | | | Polymerization result | | | | | | |
|---|---|---|---|---|---|---|---|---|---|---|---|
| | Si-compd. in Component (A) | | Component (C) | | | PAP | MFR (g/10 min) | | | | |
| Example | Name | Si/Ti mole ratio | Name | M/Al mole ratio | Activity (g-pp/g-cat) | produced (wt/%) | Intermediate sample | Polymer produced | MFR-2 | B.D. (g/cc) | Ethylene content (wt. %) |
| 26 | (a) | 4.5 | $Zr(OC_4H_9)_4$ | 0.2 | 7000 | 1.40 | 5.40 | 2.19 | $5.5 \times 10^{-3}$ | 0.457 | 5.5 |
| 27 | (b) | 4.5 | $Zr(OC_4H_9)_4$ | 0.2 | 6980 | 1.42 | 6.05 | 2.62 | $8.6 \times 10^{-3}$ | 0.460 | 5.4 |
| Comp. Exam. 8 | (c) | 4.5 | $Zr(OC_4H_9)_4$ | 0.2 | 6720 | 3.50 | 14.55 | 8.19 | $1.3 \times 10^{-1}$ | 0.387 | 5.2 |

TABLE C1-continued

| | Cat. Components | | | | Polymerization result | | | | | | |
|---|---|---|---|---|---|---|---|---|---|---|---|
| | Si-compd. in Component (A) | | Component (C) | | | PAP | MFR (g/10 min) | | | | |
| Example | Name | Si/Ti mole ratio | Name | M/Al mole ratio | Activity (g-pp/g-cat) | pro-duced (wt/%) | Inter-mediate sample | Polymer pro-duced | MFR-2 | B.D. (g/cc) | Ethylene content (wt. %) |
| 28 | (a) | 4.5 | Ti(OC$_4$H$_9$)$_2$Cl$_2$ | 0.1 | 6820 | 1.68 | 5.51 | 2.21 | $1.2 \times 10^{-3}$ | 0.452 | 5.1 |
| 29 | (a) | 4.5 | Si(OC$_2$H$_5$)$_4$ | 0.3 | 6990 | 1.38 | 5.73 | 2.44 | $7.7 \times 10^{-3}$ | 0.456 | 5.6 |
| 30 | (a) | 4.5 | Al(OC$_4$H$_9$)$_3$ | 0.3 | 6910 | 1.50 | 5.48 | 2.55 | $8.9 \times 10^{-3}$ | 0.450 | 5.4 |

(a): (CH$_3$)(t-C$_4$H$_9$)Si(OCH$_3$)$_2$
(b): (CH$_3$)(norbornyl)Si(OCH$_3$)$_2$
(c): (C$_6$H$_5$)$_2$Si(OCH$_3$)$_2$

EXAMPLE 31

The Intermediate-I was prepared as described in Example 26.

Then, a flask sufficiently substituted by nitrogen was charged with 25 ml of n-heptane amply purified and the above Intermediate-I was introduced in an amount of 0.24 mole as calculated as the Mg atom. Then, 0.4 mole of SiCl$_4$ was introduced into the flask at 30° C. over a period of 30 minutes, and reaction was carried out at 90° C. for 3 hours. After termination of the reaction, the reaction product was washed with n-heptane.

Then, a mixture of 25 ml of n-heptane and 0.016 mole of phthaloyl chloride was introduced into the flask at 70° C. over a period of 30 minutes, and reaction was carried out for 1 hour. After completion of the reaction, the reaction product was washed with n-heptane.

Finally, 5.0 g of PCl$_5$ was introduced into the flask and reaction was carried out at 95° C. for 6 hours. After termination of the reaction, the reaction product was sufficiently washed with n-heptane. In the so-obtained solid component, the Ti-content was 1.52% by weight.

Into a stainless-steel vessel of a capacity of 1.5 liters equipped with a stirring means and a temperature-controlling means was fed 500 ml of n-heptane amply dehydrated and deoxygenated, 4.2 g of triethylaluminum and 20 g of the solid product produced as described above. The temperature within the vessel was controlled at 20° C., and propylene was introduced at a constant velocity of 0.67 g/min. for 30 minutes. The product was washed with n-heptane, and was found to contain 0.86 g of polypropylene per gram of the solid catalyst component.

Then, a flask sufficiently substituted with nitrogen was charged with 50 ml of sufficiently purified n-heptane, and 5 g (as the solid catalyst) of the so-obtained solid catalyst was charged and Si/Ti=3 of t-butylmethyldimethoxysilane was introduced. Contact reaction was carried out at 50° C. for 90 minutes, and the contact product was sufficiently washed with n-heptane to obtain a Component (A).

[Copolymerization of Propylene]

Copolymerization of propylene was conducted as described in Example 26 except for the use as the catalyst Component (A) of 15 mg of the catalyst Component (A) produced or described above. The results obtained are set forth in Table C2.

EXAMPLES 32 AND 33

The procedures for production of a solid catalyst component and copolymerization of propylene as set forth in Example 31 except for the substitution as Component (C) of the alkoxy compounds set forth in Table C2 for the tetrabutoxyzirconium in the copolymerization of propylene. The results obtained are set forth in Table C2.

TABLE C2

| | Cat. Components | | | | Polymerization result | | | | | | |
|---|---|---|---|---|---|---|---|---|---|---|---|
| | Si-compd. in Component (A) | | Component (C) | | | PAP | MFR (g/10 min) | | | | |
| Example | Name | Si/Ti mole ratio | Name | M/Al mole ratio | Activity (g-pp/g-cat) | pro-duced (wt/%) | Inter-mediate sample | Polymer pro-duced | MFR-2 | B.D. (g/cc) | Ethylene content (wt. %) |
| 31 | (a) | 3 | Zr(OC$_4$H$_9$)$_4$ | 0.2 | 11400 | 1.23 | 6.72 | 2.42 | $9.0 \times 10^{-4}$ | 0.472 | 5.6 |
| 32 | " | " | B(OC$_2$H$_5$)$_3$ | 0.3 | 11610 | 1.45 | 7.02 | 2.48 | $2.4 \times 10^{-3}$ | 0.465 | 5.5 |
| 33 | " | " | Ph$_2$C(OCH$_3$)$_2$ | 0.3 | 11320 | 1.35 | 6.88 | 2.62 | $8.9 \times 10^{-4}$ | 0.470 | 5.4 |

(a): (CH$_3$)(t-C$_4$H$_9$)Si(OCH$_3$)$_2$

EXAMPLE 34

The Intermediate-I was prepared as described in Example 26.

Then, a flask sufficiently substituted by nitrogen was charged with 100 ml of n-heptane amply purified and the above Intermediate-I was introduced in an amount of 0.24 mole as calculated as the Mg atom. Then, 0.48 mole of SiCl$_4$ was introduced into the flask at 20° C. over a period of 30 minutes, and reaction was carried out at 50° C. for 3 hours. After termination of the reaction, the reaction product was washed with n-heptane.

In the so-obtained solid component, the Ti-content was 4.60% by weight.

Preliminary polymerization was conducted as described in Example 31 except for the use of 500 ml of n-heptane, 3.8 g of triisobutylaluminum in place of triethylaluminum, 20 g of the solid component obtained hereinabove, a polymerization temperature of 15° C., and production of propylene at a velocity of 2.0 g/min. for 30 minutes. The product obtained was amply washed, and was found to contain 2.67 g of polypropylene per gram of the solid catalyst.

Then, a flask sufficiently substituted with nitrogen was charged with 50 ml of sufficiently purified n-heptane, and 5 g (as the solid catalyst) of the so-obtained solid catalyst was charged and Si/Ti=3 of t-butylmethyldimethoxysilane was introduced. Contact reaction was carried out at 50° C. for 90 minutes, and the contact product was sufficiently washed with n-heptane to obtain a Component (A).

[Copolymerization of Propylene]

An autoclave as used in Example 26 was charged with 500 ml of sufficiently dehydrated and deoxygenated n-heptane, and 15 mg of the Component (A) and 125 mg of triethylaluminum as the Component (B) and 68.2 mg of tributoxyzirconium chloride as the Component (C) were introduced in a propylene atmosphere.

In the first stage of polymerization, 220 ml of hydrogen was added and propylene was introduced at a constant rate of 0.932 g/min at 75° C.

After the elapse of 3 hours, introduction of propylene was stopped, and polymerization was continued at 70° C. When the pressure became 2 Kg/cm$^2$G, 1/10 of the product was sampled. The gas phase was purged until the pressure was reduced to 0.2 Kg/cm$^2$G.

At the second stage of polymerization, ethylene was introduced at a constant rate of 0.273 g/min at 60° C. for 1.5 hours.

After termination of the polymerization, the gas phase was purged, and the slurry was filtered and dried to obtain 158.3 g of a polymer. The activity of the catalyst thus corresponds to 11,800 g-polymer/g-solid Component (A) where the polymer of the preliminary polymerization is excluded. Separately, 1.58 g of a low crystallinity polymer (PAP) formed as a by-product was obtained by drying the filtrate. MFR of the polymer formed was 2.43 g/10 min and the bulk density (B.D.) was 0.490 g/cc.

Furthermore, a polymer having MFR of 9.80 g/10 min was obtained by drying the intermediate sample. The MFR of the polymer produced at the second stage, viz. MFR−2, was calculated to be $2.8 \times 10^{-4}$ g/10 min.

EXAMPLE 35

[Preparation of Component (A)]

A flask sufficiently substituted by nitrogen was charged with 200 ml of dehydrated and deoxygenated n-heptane, and 0.4 mole of MgCl$_2$ and 0.8 mole of Ti(O—n—C$_4$H$_9$)$_4$ were introduced and reaction was carried out at 95° C. for 2 hours. After termination of the reaction, the temperature was lowered to 40° C., and 48 ml of methylhydropolysiloxane (20 cSt) was introduced and reaction was carried out for 3 hours. After completion of the reaction, the reaction product was washed with n-heptane.

Then, a flask sufficiently substituted by nitrogen was charged with 50 ml of n-heptane amply purified and the above reaction product was introduced in an amount of 0.24 mole as calculated as the Mg atom. Then, 0.4 mole of SiCl$_4$ in 25 ml of n-heptane was introduced into the flask at 30° C. over a period of 60 minutes, and reaction was carried out at 90° C. for 3 hours. Then, a mixture of 25 ml of n-heptane and 0.016 mole of phthaloyl chloride was introduced into the flask at 90° C. over a period of 30 minutes, and reaction was carried out aat 90° C. for 1 hour. After completion of the reaction, the reaction product was washed with n-heptane.

Finally, 0.24 mole of SiCl$_4$ was introduced into the flask and reaction was carried out at 100° C. for 3 hours. After termination of the reaction, the reaction product was sufficiently washed with n-heptane. This was used as a solid component for the production of component (i).

Into a stainless-steel vessel of a capacity of 1.5 liters equipped with a stirring means and a temperature-controlling means was fed 500 ml of n-heptane amply dehydrated and deoxygenated, 4.2 g of triethylaluminum and 20 g of the solid product produced as described above. The temperature of the vessel was controlled at 20° C., and propylene was introduced at a constant velocity for 30 minutes. The polymer thus produced was washed by n-heptane, and was found to have 1.02 g of polypropylene per gram of the solid component.

Then, a flask sufficiently substituted with nitrogen was charged with 50 ml of sufficiently purified n-heptane, and 5 g of the so-obtained solid component (i) was charged and 0.34 g of t-butylmethyldimethoxysilane as component (ii) was introduced. Contact reaction was carried out at 30° C. for 2 hours, and the contact product was sufficiently washed with n-heptane to obtain a Component (A).

[Polymerization of Propylene]

An autoclave equipped with a stirrer and having an inner capacity of 1.5 liters was charged with 500 ml of sufficiently dehydrated and deoxygenated n-heptane, and 15 mg, as calculated as the solid component, of the Component (A) and 125 mg of triethylaluminum as the Component (B) and 26.8 g of (C$_6$H$_5$)$_2$Si(OCH$_3$)$_2$ as the Component (C) were introduced.

In the polymerization, 60 ml of hydrogen was added and propylene was polymerized under a pressure of 5 Kg/cm$^2$G, at a temperature of 75° C. for 2 hours.

After termination of the polymerization, the slurry was filtered and dried to obtain 153.6 g of a polymer. Separately, 0.4 g of a polymer formed as a by-product was obtained by drying the filtrate. Upon extraction with boiling n-heptane, I.I of the total polymer obtained T-I.I, was 99.4% by weight. MFR of the polymer formed was 1.8 g/10 min and the bulk density (B.D.) was 0.48 g/cc.

COMPARATIVE EXAMPLE 9

The procedures for production of a Component (A) and polymerization of propylene as set forth in Example 35 were followed except for the use as component (ii) of 0.57 ml of (C$_6$H$_5$)$_2$Si(OC$_2$H$_5$)$_2$ in the production of Component (A). As a result, 122 g of a polymer was obtained having T-I.I. of 98.5% by weight, MFR of 4.1 g/10 min, and B.D. of 0.45 g/cc.

EXAMPLE 36 AND COMPARATIVE EXAMPLE 10

Polymerization for 6 hours was conducted in which Component (A) prepared in Example 35 and Comparative Example 9 was used thereby to determine how long the catalyst activity was retained. The results obtained are set forth in Table C3.

EXAMPLES 37–39 AND COMPARATIVE EXAMPLES 11–13

Polymerizations at varied temperatures were conducted in which Component (A) prepared in Example 35 and Comparative Example 9 was used thereby to determine how the catalysis was affected by the temperature used. The results obtained are set forth in Table C4.

TABLE C3

| Example | Polymer Yield (g) | MFR (g/10 min) | Polymer B.D. (g/cc) | T-I.I (wt. %) | Ratio of polymerization rates (6 hrs/2 hrs) |
| --- | --- | --- | --- | --- | --- |
| 36 | 323 | 1.3 | 0.50 | 99.2 | 2.1 |
| Comp. Exam. 10 | 195 | 3.3 | 0.47 | 98.0 | 1.6 |

TABLE C4

| Example | Polymerization temperature (°C.) | Polymer yield (g) | MFR (g/10 min) | Polymer B.D. (g/cc) | T-I.I (wt. %) |
| --- | --- | --- | --- | --- | --- |
| 37 | 80 | 157 | 1.9 | 0.47 | 99.5 |
| 38 | 85 | 161 | 2.2 | 0.46 | 99.6 |
| 39 | 90 | 165 | 2.9 | 0.45 | 99.6 |
| Comp. Exam. 11 | 80 | 131 | 5.9 | 0.43 | 98.6 |
| Comp. Exam. 12 | 85 | 130 | 7.8 | 0.40 | 98.5 |
| Comp. Exam. 13 | 90 | 124 | 7.9 | 0.37 | 98.5 |

What is claimed is:

1. A catalyst for olefin polymerization which comprises a combination of:

Component which is a solid catalyst component A obtained by contacting a component (i) which is a solid component comprising titanium, magnesium and halogen as essential elements with a component (ii) which is a silicon compound represented by a formula: $R^1R^2_{3-n}Si(OR^3)_n$ where $R^1$ stands for a branched hydrocarbon radical having 4 to 10 carbon atoms and has a secondary or tertiary carbon atom adjacent to the silicon atom or $R^1$ is either one of:

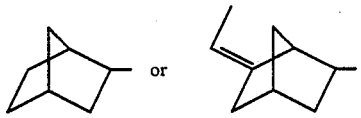

$R^2$ stands for a branched or linear aliphatic hydrocarbon radical having 1 to 10 carbon atoms which is the same as to different from $R^1$; $R^3$ is a linear aliphatic hydrocarbon radical group having 1 to 4 carbon atoms, and n stands for a number of from 1 to 3;

Component B which is an organoaluminum compound; and

Component C which is a compound represented by a formula $M(OR^4)_xR^5_yX_z$ in which M stands for an element selected from the group consisting of B, Al, C, Si, Sn, P, S, Cl, Br, I, Fe, Ti, V, Zr, Mg, Ca and Zn, $R^4$ and $R^5$ each stand for a hydrocarbon residue having 1 to 20 carbon atoms which are the same as or different from each other and X stands for halogen atom, each of x, y and z is a number which is equal to zero or is equal to or less than the valence of the element M and the sum of x, y and z is equal to the valence of the element M.

2. A catalyst for olefin polymerization as claimed in claim 1 in which the solid component (i) is a solid catalyst component of a Ziegler catalyst.

3. A catalyst for olefin polymerization as claimed in claim 2 in which the solid component (i) has undergone preliminary polymerization such that an olefin is polymerized thereover in the presence of an organometal compound that is to make up a Ziegler catalyst in combination with the solid catalyst component, the quantity of the polymer produced being 0.001 to 50 g per gram of the catalyst component (i).

4. A catalyst for olefin polymerization as claimed in claim 1 in which the quantity of the component (ii) to the component (i) is such that the atomic ratio of silicon in the component (ii) to titanium in the component (i) is 0.01 to 1000.

5. A catalyst for olefin polymerization as claimed in claim 1 in which the component (i) has an organic electron donor compound incorporated therein.

6. A catalyst for olefin polymerization as claimed in claim 5 in which the electron donor is selected from the group consisting of esters of an organic acid and acid halides.

7. A catalyst for olefin polymerization as claimed in claim 1 in which the Component C is such that the element M is selected from the group consisting of B, Al, Ti, Zr, C and Si.

8. A catalyst for olefin polymerization as claimed in claim 7 in which the Component C is selected from the group consisting of alkyl borates, aluminum halides, titanium halides, zirconium halides, methane halides, silicon halides, alkoxyzirconiums, alkoxytitaniums, alkoxycarbons, and alkoxyaluminums.

* * * * *